UNITED STATES PATENT OFFICE.

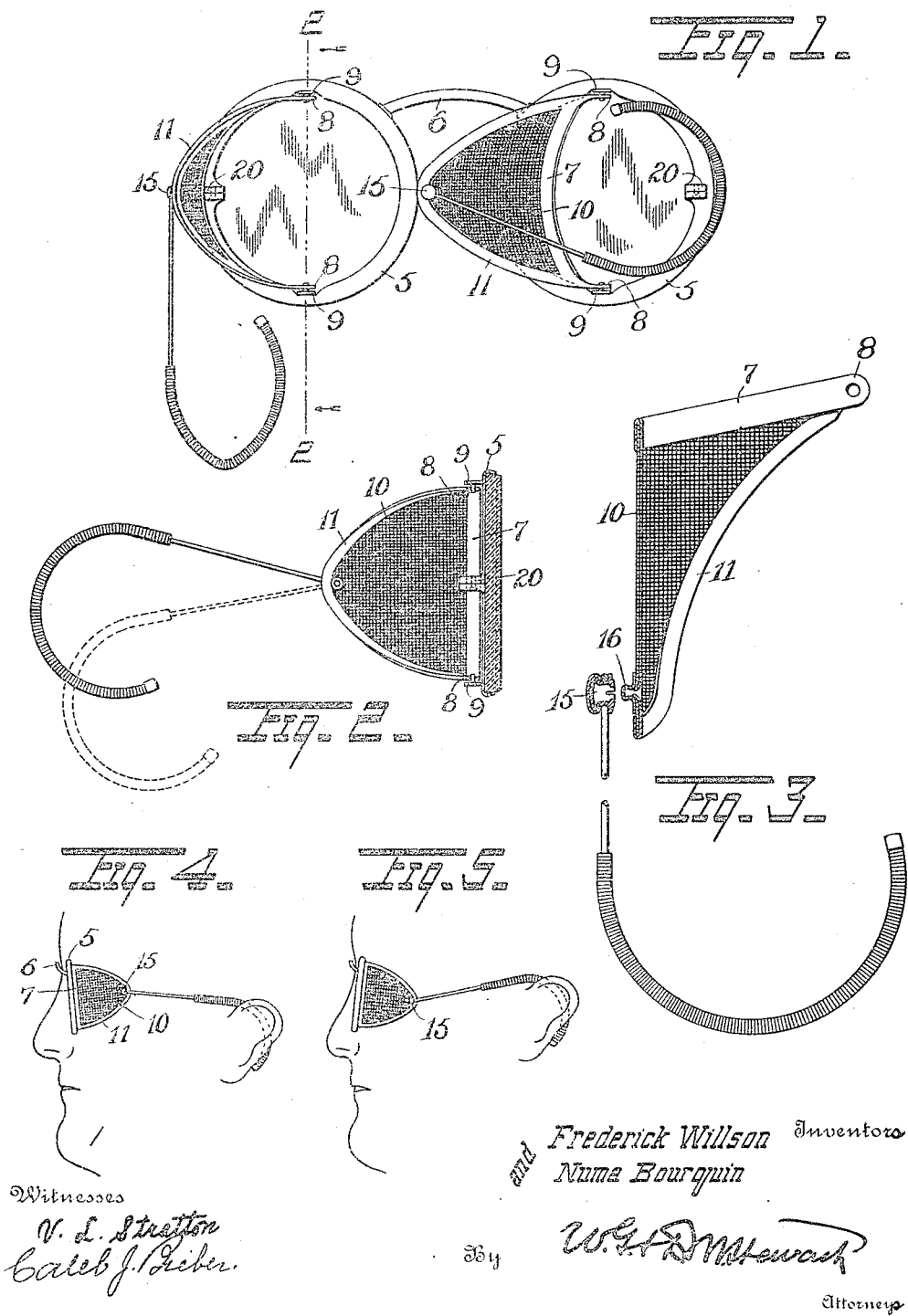

FREDERICK WILLSON AND NUMA BOURQUIN, OF READING, PENNSYLVANIA, ASSIGNORS TO T. A. WILLSON & CO., INC., OF READING, PENNSYLVANIA, A CORPORATION OF PENNSYLVANIA.

EYE-SHIELD SPECTACLES.

1,225,548.      Specification of Letters Patent.      Patented May 8, 1917.

Application filed January 15, 1915. Serial No. 2,301.

*To all whom it may concern:*

Be it known that we, FREDERICK WILLSON and NUMA BOURQUIN, both citizens of the United States, residing at Reading, in the county of Berks and State of Pennsylvania, have invented certain new and useful Improvements in Eye-Shield Spectacles, of which the following is a specification.

Our invention relates to spectacles having folding eye shields, and it consists in improved means for securing the spectacles to the head of the wearer as fully described in connection with the accompanying drawing and the novel features of which are specifically pointed out in the claims.

The main objects of the invention are to provide a common pivotal swing for each shield and temple; to provide in addition a relative pivotal movement whereby satisfactory adjustment of the spectacles to the face of the wearer, and satisfactory folding of the spectacles to collapsed form will be made practicable and easy; and to provide for convenient disconnection and replacement of separable parts.

Figure 1 is an inside view of a pair of spectacles embodying our invention; one combined shield and temple being shown in folded-down position; and the other being raised; the attached temple of the latter being swung to convenient position for showing its connection to the shield.

Fig. 2 is a cross-sectional view on the line 2—2 of Fig. 1; looking in the direction of the arrow; the attached temple being turned on its pivotal connection to the shield as might occur in one desired adjustment of the spectacles to the face and a different adjustment being indicated by a different relative position shown in dotted lines.

Fig. 3 shows the shield and temple disconnectedly.

Figs. 4 and 5 indicate the adjustability of the device in service.

The spectacle frame shown comprises, as usual, eye wires or rims 5, 5 connected by a bridge 6. Each eye shield comprises a semi-circular base piece or bar 7, bent to conform with the curvature of the glass and its inclosing eye wire, and provided with spread-apart pivot terminals 8, 8 adapted to engage pivot ears 9, 9 fixed to the eye wires at approximately diametrically opposite sides thereof; the netting 10 or other suitable material being connected to said base bar 7 and to the rigid marginal bar 11 to form a curved shield.

The temples which serve to secure the spectacles to the head of the wearer, and which are ordinarily pivoted to the end pieces of the main frame, are secured to the eye shields so as to swing jointly with the latter upon the diametral pivot connections 9, 9 of the frame. These pivot points 9, 9 on the respective eye wires are spaced apart but little farther than the centers of the glasses, so that when the temples are thus attached to the shields they are carried inconveniently far to the opposite end of the frame in folding down the shields upon the latter. To satisfactorily overcome this difficulty, and for the further important purpose hereinafter particularly referred to, our invention as illustrated, provides for independently adjusting each temple relative to the shield which carries it. This is accomplished by employing a pivotal connection between the shield and the temple, adapted to permit of the temple being swung upon the shield at right angles to the plane in which the shield swings upon the pivots 9, 9. This pivotal connection is preferably a spring socket arrangement, as shown in Fig. 3, a socket piece 15 formed on the end of the temple being adapted to be sprung into engagement with a pivot projection 16 provided on the shield. This arrangement not only permits of relative movement of the temple as stated, but also allows of conveniently removing and replacing the temples alone, as is desirable.

When the spectacles are not in use the shields may be folded down closely upon the frame without interference by the attached temples; each of the latter being turned upon its pivotal connection so as to lie closely upon its own shield as indicated to the right of Fig. 1.

When applied to the face the temples not only engage the head in well known manner so as to retain the spectacles, but at the same time permit of the frame and shields being set differently upon the face, as may be required in any particular service; the temples slanting downward from their pivotal connections to the shields when the upper portion of the lenses are set forward, and vice versa, as indicated in Figs. 4 and 5. The shields are preferably detachably engaged to the eye wires as indicated, so that any of the parts may be readily removed for cleaning or renewal.

A shield detent 20 may be provided at each end of the frame. The temples may be rigidly connected to the shields, but in such case the stated advantages of the construction specifically set forth would not be secured.

What we claim is:

1. A spectacle frame having eye-wires, curved eye shields hingedly connected to approximately diametrically opposite sides of the respective eye-wires, and temples attached only to said hinged shields.

2. A combined eye shield and temple for spectacles, said shield having a semi-circular base bar formed with pivoting terminals.

3. A pair of spectacles having eye shields formed with a semi-circularly curved base-bar having pivoted terminals, and temples pivotally connected to said shields and adapted to fold back upon, and extend beyond the pivoted terminals of, the folded shields.

4. A pair of spectacles having eye shields formed with a semi-circularly curved base-bar having pivoted terminals, and temples pivotally connected to said shields so as to swing at right-angles to the swinging plane of the shields.

5. A pair of spectacles having eye shields formed with a semi-circularly curved base-bar having pivoted terminals, and temples having pivotal spring-socket connections to said shields.

6. A spectacle frame having eye-wires, curved eye shields hingedly connected to opposite sides of the respective eye-wires, and temples pivotally attached to the respective shields and adapted to fold back upon, and extend beyond the pivot portion of, the folded shields.

7. A combined eye shield and temple for spectacles, said shield having a semi-circular base bar formed with pivoting terminals, and said temples being pivotally and detachably connected to said shield so as to swing laterally thereon.

8. A frame having eye-wires provided with lateral detents, eye-shields pivotally connected with the respective eye-wires at substantially diametrically opposite sides and having means arranged to be engaged by said detent, and temples carried by said eye-shields and projecting outwardly from the free edge thereof.

9. A pair of goggles having lens rims, and comprising eye-shields hingedly connected therewith, and substantially conforming to the periphery of said rims when in open position, temples fixed to the free ends of said shields, and means for retaining said shields and temples in open position.

10. As an article of manufacture, a combined eye-shield and temple for goggles, comprising an ovate frame having separate points of pivotal engagement and a reticulated web extending over the space included within said frame and a flexible ear engaging piece fixed to the edge of the frame.

11. A pair of goggles comprising a frame with lens rims, folding eye shields having fixedly curved base portions conforming with the outer portions of said rims, and ear engaging temples fixed to the free ends of the respective shields and foldable therewith.

12. An eye-shield for goggles comprising a curved frame arranged to be pivotally attached to the goggles and having an ear engaging member fixed to its free end, substantially as set forth.

In testimony whereof we affix our signatures in presence of two witnesses.

FREDERICK WILLSON.
NUMA BOURQUIN.

Witnesses:
W. W. LOOSE,
FRED C. STUEBNER.

Copies of this patent may be obtained for five cents each, by addressing the "Commissioner of Patents, Washington, D. C."